United States Patent
Akitomo et al.

(10) Patent No.: US 10,774,240 B2
(45) Date of Patent: Sep. 15, 2020

(54) SILICONE RUBBER COMPOSITION FOR TEXTILE COATING AND SILICONE RUBBER-COATED TEXTILE

(71) Applicant: Dow Corning Toray Co., Ltd., Tokyo (JP)

(72) Inventors: Hiroshi Akitomo, Chiba (JP); Tsugio Nozoe, Chiba (JP)

(73) Assignee: Dow Toray Co., Ltd., Tokyo (JP)

( * ) Notice: Subject to any disclaimer, the term of this patent is extended or adjusted under 35 U.S.C. 154(b) by 266 days.

(21) Appl. No.: 16/082,686

(22) PCT Filed: Feb. 28, 2017

(86) PCT No.: PCT/JP2017/008030
§ 371 (c)(1),
(2) Date: Sep. 6, 2018

(87) PCT Pub. No.: WO2017/154689
PCT Pub. Date: Sep. 14, 2017

(65) Prior Publication Data
US 2019/0092969 A1    Mar. 28, 2019

(30) Foreign Application Priority Data
Mar. 11, 2016    (JP) ................. 2016-048849

(51) Int. Cl.
| | | |
|---|---|---|
| *C09D 183/04* | (2006.01) | |
| *D06M 15/643* | (2006.01) | |
| *D06M 13/513* | (2006.01) | |
| *D06M 13/51* | (2006.01) | |
| *C08L 83/06* | (2006.01) | |
| *C09D 7/61* | (2018.01) | |
| *D06N 3/00* | (2006.01) | |
| *D06N 3/12* | (2006.01) | |
| *B60R 21/235* | (2006.01) | |
| *C08G 77/12* | (2006.01) | |
| *C08G 77/20* | (2006.01) | |

(52) U.S. Cl.
CPC ............ *C09D 183/04* (2013.01); *C08L 83/06* (2013.01); *C09D 7/61* (2018.01); *D06M 13/51* (2013.01); *D06M 13/513* (2013.01); *D06M 15/643* (2013.01); *D06N 3/0006* (2013.01); *D06N 3/128* (2013.01); *B60R 21/235* (2013.01); *B60R 2021/23514* (2013.01); *C08G 77/12* (2013.01); *C08G 77/20* (2013.01); *D06N 2203/066* (2013.01); *D10B 2505/124* (2013.01)

(58) Field of Classification Search
CPC .... D06N 3/0006; D06N 3/128; C09D 183/04; C09D 7/61; B60R 21/235; D06M 13/51; D06M 13/513; D06M 15/643
See application file for complete search history.

(56) References Cited

U.S. PATENT DOCUMENTS

| | | |
|---|---|---|
| 2003/0211340 A1 | 11/2003 | Ikeno et al. |
| 2006/0286390 A1 | 12/2006 | Yaginuma et al. |
| 2007/0281564 A1 | 12/2007 | Mizushima et al. |
| 2009/0001690 A1 | 1/2009 | Ikeno et al. |
| 2013/0102739 A1 | 4/2013 | Aketa et al. |
| 2014/0194019 A1 | 7/2014 | Greer et al. |

FOREIGN PATENT DOCUMENTS

| | | |
|---|---|---|
| CN | 103619981 A | 3/2014 |
| JP | 2005060501 A | 3/2005 |
| JP | 2006348410 A | 12/2006 |
| JP | 2008013752 A | 1/2008 |
| JP | 2009007468 A | 1/2009 |
| JP | 2009173694 A | 8/2009 |
| JP | 2013112722 A | 6/2013 |

OTHER PUBLICATIONS

Machine assisted translation of JP2013112722A obtained from Espacenet.com on Sep. 10, 2019, 19 pages.
International Search Report for PCT/JP2017/008030, dated Apr. 4, 2017, 3 pages.
English language abstract and machine translation for JP2005060501 (A) extracted from http://worldwide.espacenet.com database on Aug. 14, 2018, 20 pages.
English language abstract and machine translation for JP2009173694 (A) extracted from http://worldwide.espacenet.com database on Aug. 14, 2018, 50 pages.

*Primary Examiner* — Jeremy R Pierce
(74) *Attorney, Agent, or Firm* — Warner Norcross + Judd LLP

(57) ABSTRACT

A silicone rubber composition for textile coating is disclosed. The silicone rubber composition comprises: (A) an organopolysiloxane having at least two alkenyl groups in a molecule and having a viscosity at 25° C. of from 100 to 1000000 mPa·s; (B) an organopolysiloxane represented by an average unit formula described herein; (C) a hydrosilylation catalyst; (D) a reinforcing silica fine powder; (E) an organotitanium compound and/or an organozirconium compound; and (F) an alkoxysilane having an epoxy group and/or an alkoxysilane having a methacryl group or an acryl group. The silicone rubber composition generally reduces formation and/or expansion of openings even when a large tension is applied to a textile coated with the silicone rubber composition. A silicone rubber-coated textile and method of formation are also disclosed.

10 Claims, No Drawings

SILICONE RUBBER COMPOSITION FOR TEXTILE COATING AND SILICONE RUBBER-COATED TEXTILE

CROSS-REFERENCE TO RELATED APPLICATIONS

This application is the National Stage of International Application No. PCT/JP2017/008030 filed on 28 Feb. 2017, which claims priority to and all advantages of Japanese Patent Application No. 2016-048849 filed on 11 Mar. 2016, the content of which is hereby incorporated by reference.

TECHNICAL FIELD

The present invention relates to a silicone rubber composition for textile coating and a silicone rubber-coated textile produced by using the composition.

BACKGROUND ART

Silicone rubber-coated textiles, which were produced by coating a silicone rubber composition on a textile and curing the composition, have been used in airbags for vehicles and the like. Such a silicone rubber is required to have excellent adhesion to a textile, which serves as a base fabric of an airbag, and pliability exhibited when an airbag is deployed. In particular, internal pressure-maintaining ability of the airbag is required.

As silicone rubber compositions, for example, a silicone rubber composition formed from a diorganopolysiloxane having at least two alkenyl groups in a molecule, an organopolysiloxane resin, a silica fine powder having a specific surface area of 50 m$^2$/g or greater, an organohydrogenpolysiloxane having at least two silicon atom-bonded hydrogen atoms in a molecule, an addition reaction catalyst, an organosilicon compound having an adhesion-imparting functional group, and an organotitanium compound and/or an organozirconium compound (see Patent Document 1); a silicone rubber composition formed from an organopolysiloxane having at least two alkenyl groups bonded to silicon atom(s) in a molecule, a straight-chain organohydrogenpolysiloxane having at least two silicon atom-bonded hydrogen atoms in a molecule, an addition reaction catalyst, a silica fine powder having a specific surface area of 50 m2/g or greater, an organosilicon compound having an epoxy group and a silicon atom-bonded alkoxy group in a molecule, and a titanium compound and/or a zirconium compound (see Patent Document 2); and a silicone rubber composition formed from an organopolysiloxane having at least two alkenyl groups bonded to silicon atom(s) in a molecule, an organohydrogenpolysiloxane having at least two silicon atom-bonded hydrogen atoms in a molecule, an addition reaction catalyst, a silica fine powder having a specific surface area of 50 m$^2$/g or greater, an organosilicon compound having an epoxy group and a silicon atom-bonded alkoxy group in a molecule, an organometal compound selected from the group consisting of organotitanium compounds, organozirconium compounds, and organoaluminum compounds, and a silane or siloxane compound having one silanol group in a molecule (see Patent Document 3) have been proposed.

In such a silicone rubber composition, typically a straight-chain organohydrogenpolysiloxane is used as the organohydrogenpolysiloxane serving as a crosslinking agent. This is because, when a resin-like organohydrogenpolysiloxane is used, it is conceived that the resulting silicone rubber becomes hard and elongation becomes small, and when a silicone rubber-coated textile is used in an airbag, the foldability thereof is reduced and pliability exhibited when the airbag is deployed is reduced.

In recent years, gas pressure supplied from an inflator becomes high, and problems occur in that the internal pressure cannot be sufficiently maintained due to openings caused by a large tension applied to the textile, which serves as the base fabric of the airbag.

As a result of diligent research, the inventors of the present invention found that openings are less likely to be formed with a silicone rubber composition including a particular organohydrogenpolysiloxane as a crosslinking agent, and thus achieved the present invention.

CITATION LIST

Patent Literature

Patent Document 1: Japanese Unexamined Patent Application Publication No. 2006-348410A
Patent Document 2: Japanese Unexamined Patent Application Publication No. 2008-013752A
Patent Document 3: Japanese Unexamined Patent Application Publication No. 2009-007468A

SUMMARY OF INVENTION

Technical Problem

An object of the present invention is to provide a silicone rubber composition for textile coating that makes it difficult to form openings even when a large tension is applied to the textile. Furthermore, another object of the present invention is to provide a silicone rubber-coated textile with which openings are less likely to be formed even when a large tension is applied.

Solution to Problem

The silicone rubber composition for textile coating of the present invention is a silicone rubber composition comprising:

(A) 100 parts by mass of an organopolysiloxane having at least two alkenyl groups in a molecule and having a viscosity at 25° C. of 100 to 1000000 ·s;

(B) an organopolysiloxane represented by the average unit formula:

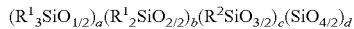

$(R^1{}_3SiO_{1/2})_a(R^1{}_2SiO_{2/2})_b(R^2SiO_{3/2})_c(SiO_{4/2})_d$ (wherein, $R^1$ is each independently an unsubstituted or halogen-substituted monovalent hydrocarbon group having no aliphatic unsaturated bond or a hydrogen atom; provided that, at least two $R^1$ in a molecule are hydrogen atoms; $R^2$ is an unsubstituted or halogen-substituted monovalent hydrocarbon group having no aliphatic unsaturated bond; and a, b, c, and d are 0 or positive numbers satisfying $0 \le a < 1$, $0 \le b < 1$, $0 \le c < 1$, $0 \le d < 1$, and $a+b+c+d=1$; provided that, a and b are not simultaneously 0, and c and d are not simultaneously 0)

(in an amount where an amount of silicon atom-bonded hydrogen atom in the present component is from 1 to 5 mol per 1 mol of alkenyl group in the component (A));

(C) hydrosilylation catalyst (in an amount that accelerates curing of the present composition);

(D) from 1 to 50 parts by mass of a reinforcing silica fine powder;

(E) from 0.01 to 5 parts by mass of an organotitanium compound and/or an organozirconium compound; and (F) from 0.05 to 10 parts by mass of an alkoxysilane having an epoxy group and/or an alkoxysilane having a methacryl group or acryl group.

The present composition preferably further contains (G) from 0.01 to 5 parts by mass of silanol group-containing organosiloxane oligomer per 100 parts by mass of the component (A).

The silicone rubber-coated textile of the present invention is a silicone rubber-coated textile formed by coating the silicone rubber composition for textile coating described above on a surface of a textile and curing the composition.

In the coated textile, the textile is preferably a hollow-woven textile, and the textile is preferably a base fabric for an airbag or a base fabric for a curtain airbag.

Effects of Invention

The silicone rubber composition for textile coating of the present invention makes it difficult to cause openings even when a large tension is applied to the textile. Fur-thermore, with the silicone rubber-coated textile of the present invention, openings are less likely to be formed even when a large tension is applied.

DETAILED DESCRIPTION OF THE INVENTION

Silicone Rubber Composition for Textile Coating

Component (A) is the base compound of the present composition and is an organopolysiloxane having at least two alkenyl groups in a molecule. Examples of the alkenyl group in component (A) include a vinyl group, an allyl group, a butenyl group, a pentenyl group, a hexenyl group, and a heptenyl group. Of these, a vinyl group is preferred. Furthermore, examples of the group bonded to a silicon atom, except the alkenyl group, in component (A) include alkyl groups, such as a methyl group, an ethyl group, a propyl group, a butyl group, a pentyl group, and a hexyl group; aryl groups, such as a phenyl group, a tolyl group, and a xylyl group; aralkyl groups, such as a benzyl group and a phenethyl group; and halogenated alkyl groups, such as a 3-chloropropyl group and a 3,3,3-trifluoropropyl group. Of these, a methyl group and a phenyl group are preferred. Furthermore, a little amount of hydroxyl group or alkoxy group, such as a methoxy group and an ethoxy group, may be bonded to the silicon atom in component (A) as long as the object of the present invention is not impaired.

The molecular structure of component (A) is not limited, and examples thereof include straight, partially branched straight, cyclic, branched-chain, network-like, and dendritic structures. The molecular structure of component (A) is preferably straight or partially branched straight. Component (A) may be a mixture of at least two types having these molecular structures. The viscosity at 25° C. of component (A) is not limited and is preferably in a range of 100 to 1000000 mPa·s or in a range of 300 to 100000 mPa·s.

Examples of such component (A) include dimethylpolysiloxane capped at both molecular terminals with dimethylvinylsiloxy groups, copolymers of dimethylsiloxane and methylvinylsiloxane capped at both molecular terminals with dimethylvinylsiloxy groups, copolymers of dimethylsiloxane and methylvinylsiloxane capped at both molecular terminals with trimethylsiloxy groups; organopolysiloxanes in which a part or all of the methyl groups of these organopolysiloxanes are substituted by alkyl groups, except methyl groups, such as ethyl groups and propyl groups, aryl groups such as phenyl groups and tolyl groups, aralkyl groups such as benzyl groups and phenethyl groups, and halogenated alkyl groups such as 3,3,3-trifluoropropyl groups; organopolysiloxanes in which a part or all of the vinyl groups of these organopolysiloxanes are substituted by alkenyl groups, except vinyl groups, such as allyl groups and propenyl groups; and mixtures of two or more of these organopolysiloxanes. In particular, from the perspective of making the viscosity of the present composition low and the perspective of ease in controlling mechanical characteristics of the silicone rubber obtained by curing the present composition, component (A) is preferably dimethylpolysiloxane capped at both molecular terminals with dimethylvinylsiloxy groups.

Component (B) is a crosslinking agent of the present composition and is an organopolysiloxane represented by the average unit formula:

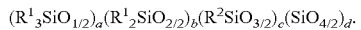

$(R^1{}_3SiO_{1/2})_a(R^1{}_2SiO_{2/2})_b(R^2SiO_{3/2})_c(SiO_{4/2})_d.$

In the formula, $R^1$ is each independently an unsubstituted or halogen-substituted monovalent hydrocarbon group having no aliphatic unsaturated bond or a hydrogen atom. Examples of such $R^1$ include alkyl groups, such as a methyl group, an ethyl group, a propyl group, a butyl group, a pentyl group, and a hexyl group; aryl groups, such as a phenyl group, a tolyl group, and a xylyl group; aralkyl groups, such as a benzyl group and a phenethyl group; and halogenated alkyl groups, such as a 3-chloropropyl group and a 3,3,3-trifluoropropyl group. Of these, a methyl group and a phenyl group are preferred. Note that, in component (B), at least two $R^1$ need to be hydrogen atoms in a molecule.

Furthermore, in the formula, $R^2$ is an unsubstituted or halogen-substituted monovalent hydrocarbon group having no aliphatic unsaturated bond, and examples thereof include the same monovalent hydrocarbon groups exemplified for $R^1$ above. Of these, a methyl group and a phenyl group are preferred.

Furthermore, in the formula, a, b, c, and d are 0 or positive numbers satisfying $0 \leq a < 1$, $0 \leq b < 1$, $0 \leq c < 1$, $0 \leq d < 1$, and $a+b+c+d=1$. However, a and b are not simultaneously 0, and c and d are not simultaneously 0. That is, the component (B) is a resin-like organopolysiloxane having siloxane units represented by formula: $R^2SiO_{3/2}$ or siloxane units represented by formula: $SiO_{4/2}$.

Examples of such component (B) include organopolysiloxanes formed from siloxane units represented by formula: $HMe_2SiO_{1/2}$ and siloxane units represented by formula: $SiO_{4/2}$, organopolysiloxanes formed from siloxane units represented by formula: $HMe_2SiO_{1/2}$, siloxane units represented by formula: $Me_3SiO_{1/2}$, and siloxane units represented by formula: $SiO_{4/2}$, organopolysiloxanes formed from siloxane units represented by formula: $Me_2SiO_{2/2}$, siloxane units represented by formula: $HMeSiO_{2/2}$, and siloxane units represented by formula: $MeSiO_{3/2}$, and organopolysiloxanes formed from siloxane units represented by formula: $Me_3SiO_{1/2}$, siloxane units represented by formula: $Me_2SiO_{2/2}$, siloxane units represented by formula: $HMeSiO_{2/2}$, and siloxane units represented by formula: $MeSiO_{3/2}$. Specific examples thereof include organopolysiloxanes represented by the average unit formula:

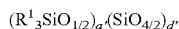

$(R^1{}_3SiO_{1/2})_a(SiO_{4/2})_{d'}$ and organopolysiloxanes represented by the average unit formula:

$(R^1{}_3SiO_{1/2})_a(R^1{}_2SiO_{2/2})_b(R^2SiO_{3/2})_c.$

In an organopolysiloxane represented by the average unit formula:

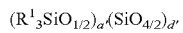

a' and d' are each independently a positive number satisfying 0<a'<1, 0<d'<1, and a'+d'=1. From the perspective of noticeably excellent effect of suppressing openings, a' and d' are preferably positive numbers satisfying 1.5≤a'/d'≤4 or 2≤a'/d'≤4.

Furthermore, in an organopolysiloxane represented by the average unit formula:

a, b, and c' are each independently 0 or a positive number satisfying 0≤a<1, 0≤b <1, 0<c'<1, and a+b+c'=1. From the perspective of noticeably excellent effect of suppressing openings, a and c' are preferably numbers satisfying 1≤a/c'≤3 or 1.5≤a/c'≤3.

The content of component (B) is an amount where an amount of silicon atom-bonded hydrogen atom in the present component is in a range of 1 to 5 mol, and preferably in a range of 1 to 4 mol, per 1 mol of alkenyl group in component (A). This is because, when the content of component (B) is greater than or equal to the lower limit of the range described above, the present composition is sufficiently cured and sufficiently adhered to a textile. On the other hand, when the content is less than or equal to the upper limit of the range described above, excellent mechanical characteristics, such as elongation, of the silicone rubber obtained by curing the present composition is achieved.

Component (C) is a hydrosilylation catalyst for accelerating curing of the present composition. Examples of component (C) include platinum metal-type catalysts, such as platinum catalysts, rhodium catalysts, ruthenium catalysts, iridium catalysts, and palladium catalysts. Of these, a platinum catalyst is preferred. Examples of the platinum catalyst include finely powdered platinum, chloroplatinic acid, alcohol solutions of chloroplatinic acid, olefin complexes of chloroplatinic acid, alkenyl-siloxane complexes of chloroplatinic acid, diketone complexes of platinum, alkenyl-siloxane complexes of platinum, olefin complexes of platinum; metal platinum supported on silica, aluminum, carbon, or the like; and thermoplastic resin powder containing these platinum catalyst. Furthermore, examples of the platinum metal-type catalyst except the platinum catalyst include $RhCl(PPh_3)_3$, $RhCl(CO)(PPh_3)_2$, $Ru_3(CO)_{12}$, $IrCl(CO)(PPh_3)_2$, and $Pd(PPh_3)_4$. Note that, in the formulas, Ph is a phenyl group.

The content of component (C) is not limited as long as the content is an amount that accelerates the curing of the present composition. Typically, the content in terms of platinum metal of component (C) is in a range of 0.1 to 500 parts by mass, and preferably in a range of 1 to 50 parts by mass, per 1000000 parts by mass of component (A). This is because the content within the range described above can sufficiently accelerate the curing of the present composition.

Component (D) is a reinforcing silica fine powder to impart mechanical strength to the silicone rubber obtained by curing the present composition. Examples of such component (D) include dry-process silica, precipitated silica, and hydrophobic silica formed by subjecting the surface of such reinforcing silica fine powders to treatment with an organosilicon compound, such as organochlorosilane, organosilazane, organoalkoxysilane, or organohydrogenpolysiloxane. In particular, component (D) preferably has a specific surface area of 50 m²/g or greater.

The content of component (D) is in a range of 0.1 to 50 parts by mass, and preferably in a range of 5 to 40 parts by mass, per 100 parts by mass of component (A). This is because, when the content of component (D) is greater than or equal to the lower limit of the range described above, excellent mechanical strength of the silicone rubber obtained by curing the present composition is achieved, and when the content is less than or equal to the upper limit of the range described above, excellent coatability of the present composition is achieved.

The organotitanium compound and/or the organozirconium compound of component (E) is component(s) to maintain adhesion of the silicone rubber to a silicone rubber-coated textile, which is formed by coating and curing the present composition, even after the textile is stored in a high temperature/high humidity condition for a long period of time.

Examples of the organotitanium compound of component (E) include organotitanic acid esters, such as tetraisopropyl titanate, tetrabutyl titanate, and tetraoctyl titanate; titanium organic acid salts such as titanium acetic acid salts; and titanium chelate compounds, such as titanium diisopropoxybis(acetylacetonate) and titanium diisopropoxybis(ethyl acetoacetate).

Furthermore, examples of the organozirconium compound of component (E) include zirconium complexes having β-diketone (including alkyl group-substituted product and fluorine-atom substituted product) as ligand(s), such as zirconium tetraacetylacetonate, zirconium hexafluoroacetylacetonate, zirconium trifluoroacetylacetonate, tetrakis(ethyltrifluoroacetylacetonate)zirconium, tetrakis(2,2,6,6-tetramethyl-heptanedionate), zirconium dibutoxybis(ethylacetoacetate), and zirconium diisopropoxybis(2,2,6,6-tetramethyl-heptanedionate). As the organozirconium compound, an acetylacetonate complex of zirconium (including alkyl group-substituted product or fluorine atom-substituted product of acetylacetonate) is particularly preferred.

In the present composition, the content of component (E) is in a range of 0.01 to 5 parts by mass, preferably in a range of 0.01 to 1 part by mass or in a range of 0.01 to 0.5 parts by mass, per 100 parts by mass of component (A). This is because, when the content of component (E) is greater than or equal to the lower limit of the range described above, excellent adhesion can be imparted to a textile with poor adhesion, such as a hollow-woven textile. On the other hand, when the content is less than or equal to the upper limit of the range described above, storage stability of the present composition is enhanced.

Furthermore, component (F) is an alkoxysilane having an epoxy group and/or an alkoxysilane having a methacryl group or acryl group to enhance excellent adhesion to a textile with poor adhesion, such as a hollow-woven textile, of the present com-position, together with omponent (E).

Examples of the alkoxysilane having an epoxy group of component (F) include 3-glycidoxypropyltrimethoxysilane, 3-glycidoxypropyltriethoxysilane, 3-glycidoxypropylmethyldimethoxysilane, 4-glycidoxybutyltrimethoxysilane, 5,6-epoxyhexyltriethoxysilane, 2-(3,4-epoxycyclohexyl)ethyltrimethoxysilane, and 2-(3,4-epoxycyclohexyl)ethyltriethoxysilane.

Furthermore, examples of the alkoxysilane having a methacryl group or acryl group of component (F) include 3-acryloxypropyltrimethoxysilane, 3-acryloxypropyltriethoxysilane, 3-acryloxypropylmethyldimethoxysilane, 3-methacryloxypropyltrimethoxysilane, 3-methacryloxypropyltriethoxysilane, and 3-methacryloxypropylmethyldimethoxysilane.

In the present composition, the content of component (F) is in a range of 0.05 to 10 parts by mass, preferably in a range of 0.05 to 5 parts by mass or in a range of 0.1 to 5 parts by mass, per 100 parts by mass of component (A). This is because, when the content of component (F) is greater than or equal to the lower limit of the range described above, excellent adhesion can be imparted to a textile with poor adhesion, such as a hollow-woven textile. On the other hand, when the content is less than or equal to the upper limit of the range described above, storage stability of the present composition is enhanced.

The present composition preferably further contains (G) silanol group-containing organosiloxane oligomer. Examples of the group bonded to a silicon atom in component (G) include alkyl groups, such as a methyl group, an ethyl group, a propyl group, a butyl group, a pentyl group, and a hexyl group; alkenyl groups, such as a vinyl group, an allyl group, a butenyl group, a pentenyl group, a hexenyl group, and a heptenyl group; aryl groups, such as a phenyl group, a tolyl group, and a xylyl group; aralkyl groups, such as a benzyl group and a phenethyl group; and halogenated alkyl groups, such as a 3-chloropropyl group and a 3,3,3-trifluoropropyl group. Of these, a methyl group and a vinyl group are preferred. The molecular structure of the component (G) is not limited, and examples thereof include straight, partially branched straight, cyclic, and branched-chain. The molecular structure of the component (G) is preferably straight. Furthermore, the viscosity at 25° C. of the component (G) is not limited; however, the viscosity is preferably less than 100 mPa·s or in a range of 1 to 50 mPa·s.

Examples of component (G) include methylvinylpolysiloxane capped at both molecular terminals with dimethylhydroxysiloxy groups and copolymers of dimethyl-siloxane and methylvinylsiloxane capped at both molecular terminals with dimethylhy-droxysiloxy groups.

In the present composition, although the content of component (G) is not limited, the content is in a range of 0.01 to 5 parts by mass, preferably in a range of 0.01 to 1 part by mass or in a range of 0.01 to 0.5 parts by mass, per 100 parts by mass of component (A). This is because, when the content of component (G) is greater than or equal to the lower limit of the range described above, excellent adhesion can be imparted to a textile with poor adhesion, such as a hollow-woven textile. On the other hand, when the content is less than or equal to the upper limit of the range described above, storage stability of the present composition is enhanced.

To enhance storage stability or to enhance handleability, the present composition preferably further contains a curing inhibitor. Examples of the curing inhibitor include acetylene-based compounds, such as 1-ethynylcyclohexan-1-ol, 2-methyl-3-butyn-2-ol, 3,5-dimethyl-1-hexyn-3-ol, and 2-phenyl-3-butyn-2-ol; enyne compounds, such as 3-methyl-3-penten-1-yne, and 3,5-dimethyl-3-hexen-1-yne; triazoles, such as benzo-triazole; and other phosphines, mercaptans, and hydrazines. The content of the curing inhibitor is not limited; however, the content is preferably in a range of 0.001 to 5 parts by mass or in a range of 0.01 to 10 parts by mass per 100 parts by mass of component (A).

Furthermore, to enhance mechanical characteristics of the silicone rubber obtained by curing the present composition, a siloxane oligomer having 5 mass % or greater of vinyl group in a molecule, such as 1,3,5,7-tetramethyl-1,3,5,7-tetravinylcyclotetrasiloxane, 1,3,5,7-tetramethyl-1,3,5,7-tetrahexenylcyclotetrasiloxane, and methylvinylsiloxane oligomers capped at both molecular terminals with trimethylsiloxy groups, may be contained. The viscosity at 25° C. of this siloxane oligomer is not limited and is preferably in a range of 0.5 to 50 mm$^2$/s. The content of the siloxane oligomer is not limited and, for example, is preferably in a range of 0.1 to 1 part by mass per 100 parts by mass of component (A).

The present composition may contain an organopolysiloxane having at least two silicon atom-bonded hydrogen atoms in each molecule besides component (B) as long as the object of the present invention is not impaired. Examples of such an organopolysiloxane include methylhydrogenpolysiloxane capped at both molecular terminals with trimethylsiloxy groups, copolymers of dimethylsiloxane and methylhydrogensiloxane capped at both molecular terminals with trimethylsiloxy, dimethylpolysiloxane capped at both molecular terminals with dimethylhydrogensiloxy groups, copolymers of dimethylsiloxane and methylhydrogensiloxane capped at both molecular terminals with dimethylhydrogensiloxy, copolymers of methylphenylsiloxane and methylhydrogensiloxane capped at both molecular terminals with dimethylphenylsiloxy groups, and cyclic methylhydrogenpolysiloxane; organopolysiloxanes in which a part or all of the methyl groups of these organopolysiloxanes are substituted by alkyl groups such as ethyl groups and propyl groups, aryl groups such as phenyl groups and tolyl groups, aralkyl groups such as benzyl groups and phenethyl groups, and halogenated alkyl groups such as 3,3,3-trifluoropropyl groups; and mixtures of two or more types of these organopolysiloxanes.

Furthermore, the present composition may contain an inorganic filler besides component (D) as long as the object of the present invention is not impaired. Examples of such an inorganic filler include extender fillers, such as quartz powder, diatomaceous earth, calcium carbonate, and magnesium carbonate; heat resistance agents, such as cerium oxide, cerium hydroxide, and iron oxide; pigments, such as red iron oxide, titanium oxide, and carbon black; and flame retardant.

The method of preparing the present composition is not limited, and the present composition can be prepared by mixing component (A) to component (F) and, as necessary, other optional components. However, a method is preferred in which, to a silica master batch prepared by heating and mixing a part of component (A) and component (D) in advance, the rest of component (A), component (B), component (C), component (E), and component (F) are blended. Note that, in the case where other optional components need to be blended, such blending may be performed during the preparation of the silica master batch. Furthermore, in the case where the other optional components are altered by heating and mixing, the other optional components are preferably blended during the blending of the rest of component (A), component (B), component (C), component (E), and component (F). Furthermore, when the silica master batch is prepared, the organosilicon compound may be blended and component (D) may be subjected to an in-situ surface treatment. The present composition may be prepared using a two-roll, a kneader/mixer, a Ross mixer, or similar known kneading apparatus.

Furthermore, to enhance storage stability, the present composition is preferably a two-component silicone rubber composition for textile coating formed from a composition (I) containing component (A), component (C), and component (D), but containing no component (B), and a composition (II) containing component (A), component (B), and component (D), but containing no component (C). Note that component (E) and component (F) may be contained in one or both of the composition (I) and the composition (II).

The state of the present composition at 25° C. is not limited and is preferably a liquid. When the present composition is a liquid at 25° C., the viscosity thereof is not limited but is preferably in a range of 10 to 500 Pa·s or in a range of 50 to 500 Pa·s. The present composition having such a viscosity can be coated on a textile as a solventless composition containing no solvent for adjusting the viscosity, achieves excellent han-dleability and coating workability, and is less likely to cause defects in the silicone rubber coating layer.

Silicone Rubber-Coated Textile

The silicone rubber-coated textile of the present invention is a silicone rubber-coated textile formed by coating the silicone rubber composition for textile coating described above on a surface of a textile and curing the composition. Examples of the textile of the present coated textile include polyamide fiber textiles, such as nylon 6, nylon 66, and nylon 46; polyester fiber textiles, such as polyethylene terephthalate, polybutylene terephthalate, and polytrimethylene terephthalate; as well as polyacryl fiber textiles, polyacrylonitrile fiber textiles, aramid fiber textiles, polyether imide fiber textiles, polysulfone-based fiber textiles, carbon fiber textiles, rayon fiber textiles, polypropylene fiber textiles, polyethylene fiber textiles, and nonwoven fabrics formed from these fibers. In particular, as a base fabric of an airbag, a polyamide fiber textile or a polyester fiber textile is preferred from the perspective of excellent heat resistance and mechanical characteristics.

The textile structure of the present coated textile is not limited and is typically a plain weave from the perspectives of productivity and thickness. Furthermore, since the coated film having excellent adhesion can be formed on a hollow-woven textile which has poor adhesion, the textile may be a hollow-woven textile having a bag-like hollow in the central portion of the textile structure.

The method of producing the present coated textile is not limited, and the silicone rubber composition for textile coating can be coated on the textile by a publicly known method, such as spraying, gravure coating, bar coating, knife coating, patting, screen printing, or dipping. At this time, the coated amount of the silicone rubber composition for textile coating is typically in a range of 25 to 150 g/m². Furthermore, after the silicone rubber composition is coated, the composition can be cured by heating at 150 to 200° C. for 1 to 2 minutes.

The silicone rubber coating layer of the present coated textile may be one layer or a multilayer with two or more layers. Furthermore, the present coated textile may further have any additional coating layers as necessary. Typically, such an additional coating layer is a layer for enhancing feeling to touch of the surface of the coated textile, further enhancing abrasion characteristics of the surface, and enhancing strength of the coated textile. Specific examples of such an additional coating layer include a coating layer formed from a plastic film, a textile, a nonwoven fabric, and another elastic coating agent.

EXAMPLES

The silicone rubber composition for textile coating and the silicone rubber-coated textile of the present invention will be described in detail using examples.

Viscosity of Organopolysiloxane and Silicone Rubber Composition

The viscosities at 25° C. (mPa·s) of the organopolysiloxane and the silicone rubber composition for textile coating were measured using a B type viscometer in accordance with JIS K7117-1, and the kinematic viscosities thereof (mm²/s) were measured using an Ubbelohde type viscometer in accordance with JIS Z8803.

Characteristics of Silicone Rubber

A silicone rubber sheet having a thickness of 2 mm was prepared by subjecting the silicone rubber composition for textile coating to press vulcanization at a pressure of 20 MPa at 150° C. for 5 minutes. The hardness of the silicone rubber sheet was measured using a type A durometer stipulated in JIS K 6253. Furthermore, the tensile strength and the elongation of the silicone rubber were measured by methods stipulated in JIS K 6251.

Production of Silicone Rubber-Coated Textile

A hollow-woven textile for curtain shield airbags formed from polyethylene terephthalate was cut to a rectangular shape having a width of 70 mm and a bag portion side of 100 mm and a closed portion side of 70 mm which were located in a manner that a bag portion and a closed portion sandwiches a boundary therebetween. The silicone rubber composition for textile coating was coated on one face thereof using a Baker type applicator in a manner that the coated amount was 60 to 100 g/m². Then, the coated textile was heated in an oven at 200° C. for 90 seconds to cure the silicone rubber composition. Similarly, the silicone rubber composition for textile coating was also coated on the other face to produce a silicone rubber-coated textile.

Tensile Strength of SILICONE Rubber-Coated Textile

From the silicone rubber-coated textile produced as described above, a rectangular test sample, in which a width was 50 mm, a length of the bag portion was 80 mm and a length of the closed portion was 50 mm, was cut out. This test sample was opened up and the both ends thereof were grabbed so that the test sample was stretched using two air chucks, which were provided with a tensile tester and arranged in a manner that the distance therebetween was 100 mm. The test sample was stretched at a rate of 200 mm/min and the maximum tensile strength was measured at this time.

Opening of Silicone Rubber-Coated Textile

From the silicone rubber-coated textile produced as described above, a rectangular test sample, in which a width was 50 mm, a length of the bag portion was 80 mm and a length of the closed portion was 50 mm, was cut out. This test sample was opened up and the both ends thereof were grabbed so that the test sample was stretched using two air chucks, which were provided with a tensile tester and arranged in a manner that the distance therebetween was 100 mm. The test sample was stretched at a rate of 200 mm/min, and difference (mm) between the degree of opening at 200 N/cm and the degree of opening of non-coated textile, to which the silicone rubber was not coated, measured in the same conditions was determined.

Preparation Example 1

In a Ross mixer, 100 parts by mass of dimethylpolysiloxane capped at both molecular terminals with dimethylvinylsiloxy groups having a viscosity of 40000 mPa·s (vinyl group content=approximately 0.09 mass %), 40 parts by mass of fumed silica having a BET specific surface area of 225 m$^2$/g, 7 parts by mass of hexamethyld-isilazane, 2 parts by mass of water, and 0.2 parts by mass of copolymer of dimethyl-siloxane and methylvinylsiloxane capped at both molecular terminals with dimethylhy-droxysiloxy groups having a viscosity of 20 mPa·s (vinyl group content=approximately 10.9 mass %) were charged and mixed at room temperature until the mixture became uniform. Thereafter, the mixture was subjected to heat treatment at 200° C. under reduced pressure for 2 hours to prepare a silica master batch with flowability.

Examples 1 to 4 and Comparative Examples 1 and 2

A silicone rubber composition for textile coating was prepared by uniformly mixing the components described below at the composition shown in Table 1. Characteristics of the obtained silicone rubber composition for textile coating and the obtained silicone rubber-coated textile are shown in Table 1. Note that [SiH/Vi] in Table 1 indicates the number of moles of silicon atom-bonded hydrogen atom of the component (B) per 1 mol of the alkenyl group in the component (A).

The following component was used as component (A).

(a-1): dimethylpolysiloxane capped at both molecular terminals with dimethylvinylsiloxy groups having a viscosity of 40000 mPa·s (vinyl group content=approximately 0.09 mass %)

The following components were used as component (B). Note that, in the formulas, "Me" represents a methyl group.

(b-1): organopolysiloxane that has a kinematic viscosity of 18 mm$^2$/s and that is represented by the average unit formula:

$$(HMe_2SiO_{1/2})_{0.67}(SiO_{4/2})_{0.33}$$

(silicon atom-bonded hydrogen atom content=approximately 0.97 mass %)

(b-2): organopolysiloxane that has a kinematic viscosity of 15 mm2/s and that is represented by the average unit formula:

$$(Me_3SiO_{1/2})_{0.09}(Me_2SiO_{2/2})_{0.32}(MeSiO_{2/2})_{0.54}(MeSiO_{3/2})_{0.05}$$

(silicon atom-bonded hydrogen atom content=approximately 0.83 mass %)

(b-3): copolymer of dimethylsiloxane and methylhydrogensiloxane capped at both molecular terminals with trimethylsiloxy groups that has a kinematic viscosity of 5.5 mm$^2$/s (silicon atom-bonded hydrogen atom content=approximately 0.73 mass %)

(b-4): copolymer of dimethylsiloxane and methylhydrogensiloxane capped at both molecular terminals with trimethylsiloxy groups that has a kinematic viscosity of 50 mm$^2$/s (silicon atom-bonded hydrogen atom content=approximately 0.30 mass %)

The following component was used as component (C).

(c-1): 1,3-divinyltetramethyldisiloxane solution of 1,3-divinyltetramethyldisiloxane complex of platinum (platinum metal content=approximately 4000 ppm)

The following component was used as component (D).

(d-1): silica master batch prepared in Preparation Example 1

The following component was used as component (E).

(e-1): zirconium tetraacetylacetonate (product name: ORGATIX ZC-150, manufactured by Matsumoto Fine Chemical Co., Ltd.)

The following component was used as component (F).

(f-1): 3-glycidoxypropyltrimethoxysilane

The following component was used as component (G).

(g-1): silanol group-containing organosiloxane oligomer; copolymer of dimethyl-siloxane and methylvinylsiloxane capped at both molecular terminals with dimethylhy-droxysiloxy groups that has a viscosity of 20 mPa·s (vinyl group content=approximately 10.9 mass %)

The following components were used as other components.

Curing retarder: 1-ethynylcyclohexan-1-ol

Siloxane oligomer: cyclic methylvinylpolysiloxane having a viscosity of 3.5 mm$^2$/s (vinyl group content=approximately 30.7 mass %)

TABLE 1

| | | | | Example | | | | Comparative Examples | |
|---|---|---|---|---|---|---|---|---|---|
| | | | | 1 | 2 | 3 | 4 | 1 | 2 |
| Silicone rubber composition for textile coating | Composition (parts by mass) | (A) | (a-1) | 100 | 100 | 100 | 100 | 100 | 100 |
| | | (B) | (b-1) | 0.85 | 1.85 | 1.85 | — | — | — |
| | | | (b-2) | — | — | — | 1.01 | — | — |
| | | | (b-3) | — | — | — | — | 4.13 | — |
| | | | (b-4) | — | — | — | — | — | 6.15 |
| | | (C) | (c-1)* | 8.3 | 8.3 | 8.3 | 8.3 | 8.3 | 8.3 |
| | | (D) | (d-1)** | 19.84 | 20.04 | 20.04 | 19.87 | 20.09 | 20.48 |
| | | (E) | (e-1) | 0.19 | 0.19 | 0.19 | 0.19 | 0.19 | 0.19 |
| | | (F) | (f-1) | 0.72 | 0.72 | 0.72 | 0.72 | 0.72 | 0.72 |
| | | (G) | (g-1) | 0.18 | 0.18 | 0.18 | 0.18 | 0.18 | 0.18 |
| | | | Curing retarder | 0.07 | 0.07 | 0.07 | 0.07 | 0.07 | 0.07 |
| | | | Siloxane oligomer | — | — | 0.43 | — | — | — |
| | | | SiH/Vl | 1.5 | 3.3 | 1.7 | 1.5 | 3.4 | 3.4 |
| | | | Viscosity (Pa · s) | 121 | 115 | 99 | 101 | 95 | 95 |
| Characteristics of silicone rubber | | | Hardness | 25 | 20 | 28 | 25 | 8 | 19 |
| | | | Tensile strength (MPa) | 8.4 | 8.4 | 6.6 | 7.1 | 5.5 | 8.8 |
| | | | Elongation (%) | 850 | 1025 | 695 | 805 | 1500 | 1010 |

TABLE 1-continued

| | | | Example | | | | Comparative Examples | |
|---|---|---|---|---|---|---|---|---|
| | | | 1 | 2 | 3 | 4 | 1 | 2 |
| Characteristics of silicone rubber-coated textile | Tensile strength (MPa) | Intial | 16.8 | 17.6 | 17.5 | 17.6 | 19.6 | 18.3 |
| | | 110° C. after day 1 | 17.3 | 17.6 | 18.1 | 17.8 | 21.4 | 19.9 |
| | Opening (mm) | Intial | 1.5 | 2.3 | 2.2 | 2.3 | 4.3 | 3.0 |
| | | 110° C. after day 1 | 2.0 | 2.3 | 2.8 | 2.5 | 6.1 | 4.6 |

*indicates the number of mass ppm of platinum metal in the composition
**indicates the added amount of fumed silica added as the silica master batch

INDUSTRIAL APPLICABILITY

Since the silicone rubber composition for textile coating of the present invention adheres firmly to a poorly adhesive textile such as a hollow-woven textile and is less likely to cause openings even when the resulting silicone rubber-coated textile is subjected to tensile force. Therefore, the silicone rubber composition for textile coating is suitable as a coating agent for a textile used in, for example, airbags, such as curtain shield airbags, driver airbags, passenger seat airbags, side airbags, knee airbags, and ITS head airbags, emergency escape seats for aircraft, and expandable rafts. Furthermore, the silicone rubber-coated textile of the present invention is suitable as a base fabric for curtain shield airbags, emergency escape seats for aircraft, or the like.

The invention claimed is:

1. A silicone rubber composition for textile coating, the silicone rubber composition comprising:
    (A) 100 parts by mass of an organopolysiloxane having at least two alkenyl groups in a molecule and having a viscosity at 25° C. of from 100 to 1000000 mPa·s;
    (B) an organopolysiloxane represented by the average unit formula:

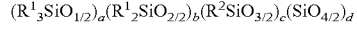
    $(R^1_3SiO_{1/2})_a(R^1_2SiO_{2/2})_b(R^2SiO_{3/2})_c(SiO_{4/2})_d$ where each $R^1$ is an independently selected unsubstituted or halogen-substituted monovalent hydrocarbon group having no aliphatic unsaturated bond or a hydrogen atom; provided that, at least two $R^1$ in the molecule are hydrogen atoms; $R^2$ is an unsubstituted or a halogen-substituted monovalent hydrocarbon group having no aliphatic unsaturated bond; and a, b, c, and d are 0 or positive numbers satisfying $0 \leq a < 1$, $0 \leq b < 1$, $0 \leq c < 1$, $0 \leq d < 1$, and $(a+b+c+d)=1$; provided that, a and b are not simultaneously 0, and c and d are not simultaneously 0; wherein component (B) is present in an amount such that the amount of silicon atom-bonded hydrogen atoms in component (B) is from 1 to 5 mol per 1 mol of alkenyl groups in component (A);
    (C) a hydrosilylation catalyst; wherein component (C) is present in an amount that accelerates curing of the silicone rubber composition;
    (D) from 1 to 50 parts by mass of a reinforcing silica fine powder;
    (E) from 0.01 to 5 parts by mass of an organotitanium compound and/or an organozirconium compound; and
    (F) from 0.05 to 10 parts by mass of an alkoxysilane having an epoxy group and/or an alkoxysilane having a methacryl group or an acryl group.

2. The silicone rubber composition for textile coating according to claim 1, further comprising (G) from 0.01 to 5 parts by mass of a silanol group-containing organosiloxane oligomer per 100 parts by mass of component (A).

3. A silicone rubber-coated textile formed by coating the silicone rubber composition for textile coating according to claim 1 on a surface of a textile and curing the silicone rubber composition.

4. The silicone rubber-coated textile according to claim 3, wherein the textile is a hollow-woven textile.

5. The silicone rubber-coated textile according to claim 3, wherein the textile is a base fabric for an airbag.

6. The silicone rubber-coated textile according to claim 3, wherein the textile is a base fabric for a curtain shield airbag.

7. A silicone rubber-coated textile formed by coating the silicone rubber composition for textile coating according to claim 2 on a surface of a textile and curing the silicone rubber composition.

8. The silicone rubber-coated textile according to claim 7, wherein the textile is a hollow-woven textile.

9. The silicone rubber-coated textile according to claim 7, wherein the textile is a base fabric for an airbag.

10. The silicone rubber-coated textile according to claim 7, wherein the textile is a base fabric for a curtain shield airbag.

* * * * *